United States Patent [19]

Walling

[11] Patent Number: 4,541,783

[45] Date of Patent: * Sep. 17, 1985

[54] LONG STROKE, DOUBLE ACTING PUMP HAVING TENSION GUIDE MEMBER

[76] Inventor: John B. Walling, P.O. Box 16266, Fort Worth, Tex. 76133

[ * ] Notice: The portion of the term of this patent subsequent to Sep. 27, 2000 has been disclaimed.

[21] Appl. No.: 497,122

[22] Filed: Jun. 30, 1983

Related U.S. Application Data

[63] Continuation of Ser. No. 196,837, Oct. 14, 1980, Pat. No. 4,406,598, which is a continuation-in-part of Ser. No. 170,610, Jul. 21, 1980, Pat. No. 4,336,415.

[51] Int. Cl.$^4$ ............................................. F04B 47/08
[52] U.S. Cl. ..................................... 417/404; 92/108
[58] Field of Search .................. 92/107, 108; 417/390, 417/403, 404

[56] References Cited

U.S. PATENT DOCUMENTS

| | | | |
|---|---|---|---|
| 1,593,820 | 7/1926 | Gates | 417/390 |
| 2,800,924 | 7/1957 | Antrim, Jr. | 92/107 X |
| 3,043,340 | 7/1962 | Rehbock | 92/107 X |
| 3,104,592 | 9/1963 | Sheesley | 92/107 X |
| 4,406,598 | 9/1983 | Walling | 417/404 |

*Primary Examiner*—Leonard E. Smith
*Attorney, Agent, or Firm*—Glaser, Griggs & Schwartz

[57] ABSTRACT

A downhole, electro-hydraulic pump assembly, having a hydraulic power piston connected to a double-acting production piston is disclosed. Hydraulic power for operating the power piston is developed downhole by a mechanical pump which is driven by an electrical motor carried within the pump housing. The electrical motor is energized by high-cycle electrical power conducted from a surface facility for increased pumping capability in very deep wells. Long stroke capability is provided by an annular piston and a tubular connecting ram which ride on a tensioned guide tube. The effective production piston area is maximized for efficient production in both up-stroke and down-stroke by conducting the flow of formation fluid produced in the down-stroke through the bore of the tensioned guide tube. The electric drive motor and hydraulic drive pump are operated safely at high power levels because of the improved heat dissipation arrangement in which the electrical motor and pump are cooled by circulation of the power fluid within the pump housing, with the power fluid being continuously circulated to the surface through a filter and heat exchanger. In a preferred embodiment, the downhole electrical drive motor is energized from the surface by a cyclo-converter having a continuously variable frequency output, whereby the stroke speed is also continuously variable over a wide range to accomodate changes in the producing formation.

15 Claims, 13 Drawing Figures

LONG STROKE, DOUBLE ACTING PUMP HAVING TENSION GUIDE MEMBER

CROSS REFERENCE TO RELATED APPLICATION

This is a continuation of application Ser. No. 196,837, filed Oct. 14, 1980, now U.S. Pat. No. 4,406,598, which is a continuation-in-part of U.S. application Ser. No. 170,610 filed July 21, 1980, now U.S. Pat. No. 4,336,415.

BACKGROUND OF THE INVENTION

1. Field of the Invention

This invention relates generally to well production equipment, and in particular to an electro-hydraulic submersible pump.

2. Description of the Prior Art

Various types of artificial lifts are used to bring liquids to the surface of the earth when the pressure of the liquid-bearing reservoir is insufficient to produce the formation fluids by natural means. The pumping motion of the artificial lift may originate at the surface of the ground, or below, as a result of the application of electrical or fluid power to a subsurface pump. In the usual surface powered rig, a vertically reciprocating pump element at the bottom of the well is actuated by a walking beam pivotly mounted on a Sampson post and connected at one end to a sucker rod string and at the other end to a prime mover which supplies power through Pitman gear for producing the reciprocating motion of the sucker rod string.

Generally, in the surface powered rig, the prime mover consists of an internal combustion engine or electric motor. The cost of this prime mover, as well as its operation and maintenance, is, in many instances, a significant economic factor in the production of liquids from subterranean liquid-bearing reservoirs. The sucker rods are characterized by a short, fast stroke, resulting in low pump efficiency, high power consumption and low recovery rates.

An additional limitation of surface-powered rigs which operate a sucker rod through rigid production tubing is that, for practical purposes, the weight of the sucker rod for wells having a producing formation at about 10,000 feet or deeper is excessive, resulting in stretching and early failure of the rods. Moreover, the sucker rod assembly is subject to severe wear in slant-hole or crooked-hole wells. In slant-hole wells, of the type typically drilled offshore, the sucker rod is subjected to severe frictional wear because of the slant of the hole, and is therefore subject to early failure and requires frequent replacement. Frictional wear is also a serious problem in crooked holes in which the well bore follows a helical path. Because of the difficulty of drilling a vertical well at other than shallow depth, effective use of the sucker rod pumping assembly is substantially limited to shallow wells.

For the foregoing reasons, there has been considerable interest in improving pumping systems in which the motive force is provided by electrical or pneumatic/hydraulic power applied to a subsurface pump, thereby eliminating the sucker rods and affording precise control of the pumping action.

Submersible pumps of the type in which the motive force is derived from electrical, hydraulic or pneumatic power applied downhole represent a significant improvement over the reciprocating sucker rod approach. According to conventional practice, the submersible pump which is driven downhole by the electrical/hydraulic or pneumatic driving means is supported at the end of a long string of rigid production tubing joints which are coupled to each other by pin and box connections. Power conductors, signal conductors and hydraulic/pneumatic conduits are bundled together in an external umbilical cable assembly secured to the rigid production tubing joints, and are coupled to the downhole pump.

Conventional hydraulically operated submersible pumps commonly employ a reciprocating piston within a stationery cylinder, with a slender connecting rod being used to connect the hydraulic motor to the production pump. Hydraulic fluid is conveyed under pressure through long conduit lines which extend from a surface pumping facility through an umbilical conduit line to the drive piston. Although this arrangement has achieved a measure of success, its usefulness is limited to relatively shallow wells, because of the relatively high pressure drop across the long hydraulic conduits. A further limitation on the hydraulic pump assembly is imposed by the slender rod which is commonly used to connect the drive piston to the production piston within the pump. Since the slenderness ratio of the connecting rod is unfavorable for action in compression, the effective length of the pump stroke must be maintained at a low value and the speed of operation maintained at a moderately high value in order that a sufficient quantity of formation fluid can be pumped. This results in a churning action which tends to cause the formation of emulsion.

OBJECTS OF THE INVENTION

It is, therefore, the principal object of the present invention to provide a reciprocating, hydraulically actuated piston pump in which the hydraulic driving power is developed downhole, thereby rendering the pump suitable for use at great depths in formations which lie beyond the practical operating range of surface powered rigs in which pumping power is transmitted by sucker rods.

A related object of the invention is to provide a reciprocating piston pump having a relatively long stroke capability.

Yet another object of the invention is to provide a reciprocating piston pump having increased pumping power for very deep wells.

A related object of the invention is to provide a reciprocating piston pump in which the stroke speed is continuously variable over a wide range.

Still another object of the invention is to provide a hydraulically actuated, reciprocating piston pump in which the hydraulic power is developed downhole by an electrical motor prime mover which is powered from the surface through electrical conductors.

Another object of the invention is to provide a double-acting, reciprocating piston pump in which production is achieved on both up-stroke and down-stroke.

Yet another object of the invention is to provide a reciprocating piston pump in which a power piston is coupled to a production piston by a relatively long connecting rod for long-stroke capability, in which lateral deflection of the connecting rod is minimized, thereby making possible long-stroke operation at relatively rapid stroke rates without the risk of causing buckling damage in the connecting rod.

Still another object of the invention is to provide an electro-hydraulic submersible pump having a minimum number of moving parts for greater reliability.

Another object of the invention is to provide an electro-hydraulic actuated piston pump having improved heat dissipation for reliable pump operation at high power levels.

Still another object of the invention is to provide a double-acting, reciprocating piston pump in which formation fluid is produced efficiently in both up-stroke and down-stroke movements.

Yet another object of the invention is to provide double-acting, reciprocating piston pump in which the effective production piston area is maximized for efficient production in both up-stroke and down-stroke.

A related object of the invention is to provide an efficient housing structure for conducting produced formation fluid through an elongated, double-acting submersible pump.

SUMMARY OF THE INVENTION

The foregoing objects are achieved in a double-acting electro-hydraulic piston pump in which a hydraulically actuated power piston drives a production piston. Hydraulic power is developed internally within the downhole pump housing by a hydraulic pump which draws hydraulic power fluid from a reservoir within the pump housing. The pump is driven mechanically by an electrical motor which is received within the pump housing. The drive motor is energized electrically from the surface through conductors which extend from a surface facility to the pump.

According to one embodiment, electrical power is conducted downhole at relatively high frequency to avoid line losses. In this arrangement, the motor is driven at a relatively constant, high-speed, with its output being reduced through a gear drive assembly connected between the pump and the motor.

In an alternate arrangement, the downhole electric drive motor is driven by a cyclo-converter whose output is variable over a wide frequency range.

Sustained operation at relatively high power levels is made possible by an improved heat dissipation arrangement in which the electrical drive motor and pump are received within the power fluid reservoir of the pump assembly, and are cooled by circulation of the spent hydraulic power fluid. The hydraulic power fluid is continuously circulated through auxillary conduits to a surface facility where it is filtered and temperature controlled through a heat exchanger, as necessary.

In yet another embodiment of the invention, the stroke range is greatly increased by an annular power piston and production piston which are interconnected by an elongated tubular ram or connecting tube. Lateral deflection of the tubular connecting ram is minimized by guiding it and the annular pistons along a guide rod which is maintained under tension at all times. The long, slender connecting ram is further reinforced by the bore of a partition block which separates the power piston bore with respect to the production piston bore.

The tension rod is preferably tubular and the produced formation fluid is conducted upwardly through the tubular tension rod on the down-stroke, thereby allowing the effective production piston area to be maximized with respect to the diameter of the pump.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

DETAILED DESCRIPTION OF THE PREFERRED EMBODIMENTS

In the description which follows, like parts are marked throughout the specification and drawings with the same reference numerals, respectively. The drawings are not necessarily to scale and in some instances portions have been exaggerated in order to more clearly depict certain features of the invention.

Figure 1:
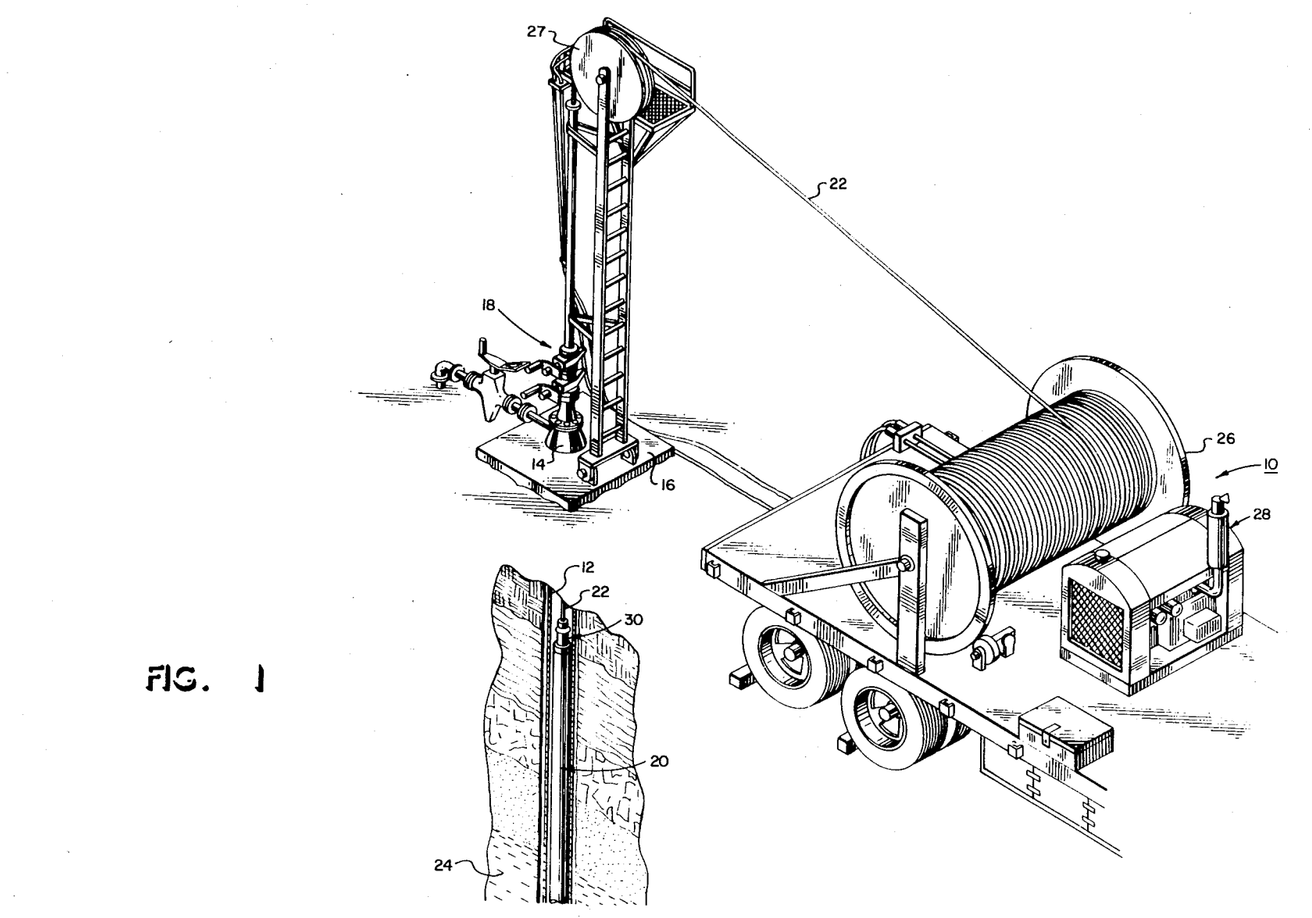
FIG. 1 is a perspective view which illustrates the installation of a submersible pump in a well bore.

Referring now to FIG. 1, a pump installation rig 10 is set up adjacent a well site in which a well casing 12 is terminated by a lower well head flange 14 and is anchored to a concrete block 16 in the usual manner. A slip and packer assembly 18 extends above the lower flange 14. Extending through the slip assembly and into the bore of the well casing 12 is a submersible pump 20 which is supported by a length of flexible production tubing 22 for recovering fluids and minerals from a producing formation 24. The pump 20 is lowered and retracted through the well casing 12 as the flexible tubing 22 is played out and taken up by a reel 26 and a hydraulically powered bull wheel 27 according to control signals generated at an operator console and power station 28. The flexible production tubing 22 is attached to the upper end of the pump 20 by means of a connector assembly 30, as set forth in co-pending U.S. patent application Ser. No. 150,615, filed May 16, 1980, which is hereby incorporated by reference.

The flexible tubing assembly 22 is an integrated assembly of a relatively large diameter core tube 32 which serves as the production conduit, and a pair of relatively small diameter auxillary hydraulic conduits 34, 36 for circulating hydraulic fluid from a surface reservoir facility to the downhole pump for heat transfer and filtering purposes. Additionally, the integrated flexible tubing assembly includes electrical conductors 38, 40 and 42 for conducting electrical power from a surface facility to drive a downhole electrical motor.

Referring now to FIGS. 2–11, the pump 20 includes an elongated, cylindrical pump housing 44 having a bore 46 in which the component parts of the pump are received. The principal components received within the pump housing are an electrical drive motor 48, a hydraulic pump 50, a hydraulic shuttle valve 52, a power piston 54, a production piston 56, and a tubular connecting ram 58 which interconnects the power piston and production piston.

Figures 2, 3:
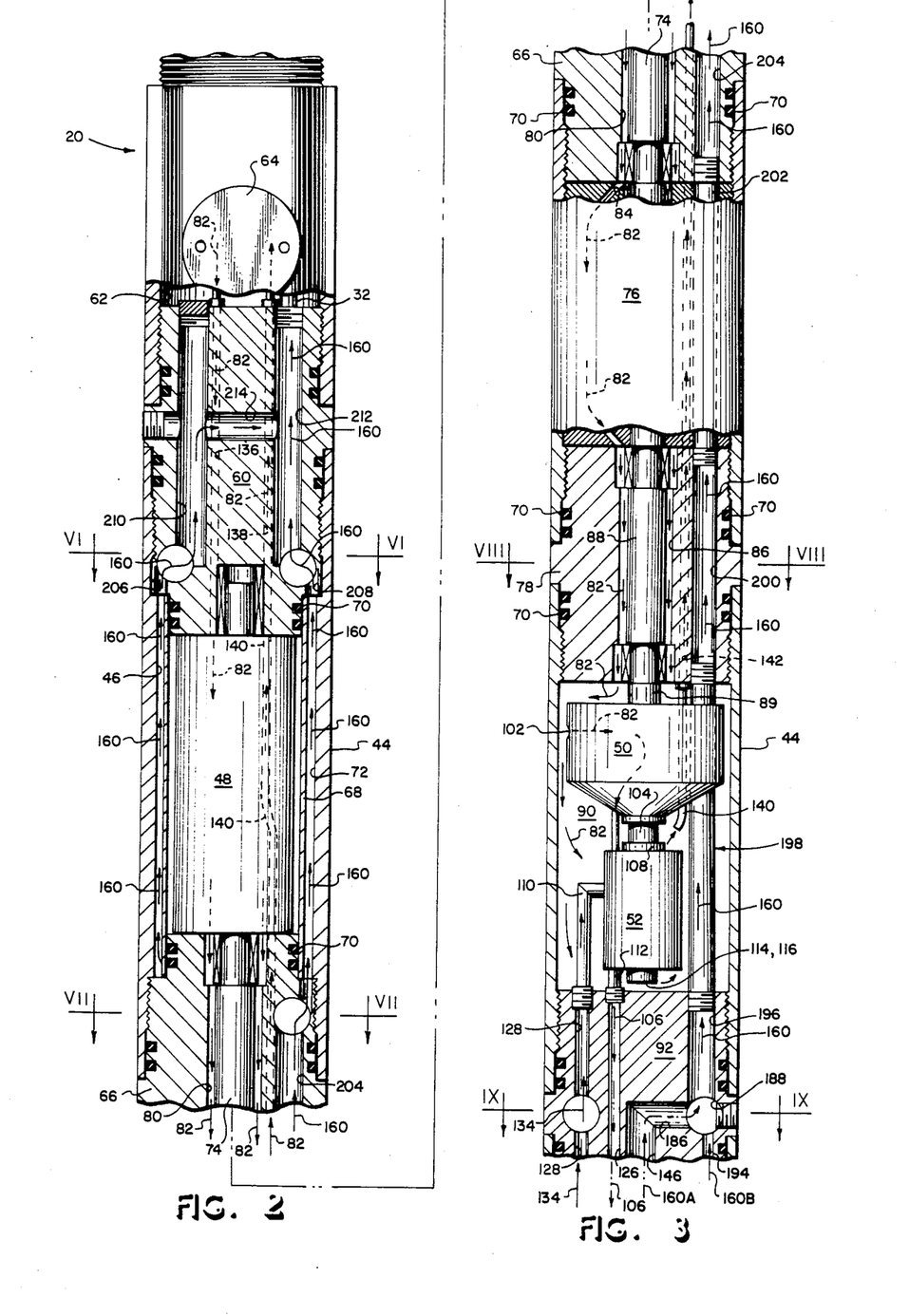
FIG. 2 is a longitudinal sectional view through the upper portion of a hydraulic pump embodying the invention.
FIG. 3 is a downward continuation of FIG. 2.

Referring now to FIG. 2, the upper end of the pump housing 44 is sealed by a partition block 60. Immediately above the partition block 60 is a cylindrical chamber 62, through which the electrical conductors 38, 40 and 42, the production conduit 32 and the auxillary hydraulic conduits 34, 36 (FIG. 12) are extended from the connector 30 (FIG. 1). The ends of the conduits and conductors are coupled to the pump by swage lock connectors within the connector chamber 62. Access to the swage connections is gained through an access port which is closed by a removable cover plate 64.

The uppermost component of the pump assembly 20 is the electric motor 48 which is confined axially within the bore 46 between the upper partition block 60 and an intermediate partition block 66. The electric motor 48 is radially confined by a cylindrical partition 68 which is sealed by O-ring seals 70 at opposite ends. The annulus 72 between the cylindrical partition 68 and the side wall of the housing 44 defines a flow passage around the electric motor 48 for the flow of produced formation fluid.

The electric motor 48 is preferably a three-phase electrical induction motor which is energized by three-phase electrical power conducted through the power conductors 38, 40 and 42 from a surface facility. According to a preferred embodiment, the electric power is conducted at a relatively high frequency, for example, 400 Hz and the electric motor 48 turns at a substantially constant, relatively high rpm, for example, 12,000 rpm at 400 Hz. The available horsepower is from four to 200 horsepower, depending upon the rating of the motor.

Because of the relatively high rpm, it is necessary to reduce the rpm to a lower level within the operating range of the pump 50. Accordingly, the rotor of the electric motor 48 is connected via a shaft 74 to a gear reduction drive assembly 76 having a gear ratio of 6:1, whereby its output is 2000 rpm. The gear drive assembly 76 is confined between the intermediate partition block 66 and an intermediate partition block 78. The block 78 has a large bore 80 through which the rotor connecting shaft 74 is extended, with the annular space between the shaft 74 and bore 80 defining a flow passage for circulation of spent power fluid as indicated by the arrows 82.

According to an important feature of the invention, the housing of the electric motor 48 is provided with fluid flow passages through which the spent power fluid is circulated for heat transfer and lubrication purposes. Additionally, the gear 76 is also provided with fluid flow passages 84 for heat transfer and lubrication purposes.

The intermediate partition block 78 is likewise provided with an axial bore 86 through which a relatively small diameter connector shaft 88 is extended. The annulus between the connector shaft 88 and the bore 86 defines a flow passage for circulation of power fluid, as indicated by the arrows 82. The opposite end of the shaft 88 is connected to the drive shaft 89 of the pump 50, whereby the pump is driven when the electric motor 48 is energized.

The pump 50 and valve 52 are received within a chamber 90 bounded on its upper end by the intermediate partition 78, and on its lower end by an intermediate partition block 92. The chamber 90 serves as a reservoir for spent power hydraulic fluid. According to an important feature of the invention, the spent power hydraulic fluid is circulated to the surface and through a filter 94, a primary reservoir 96 and a heat exchanger 98, by a surface mounted hydraulic pump 100.

Figure 12:
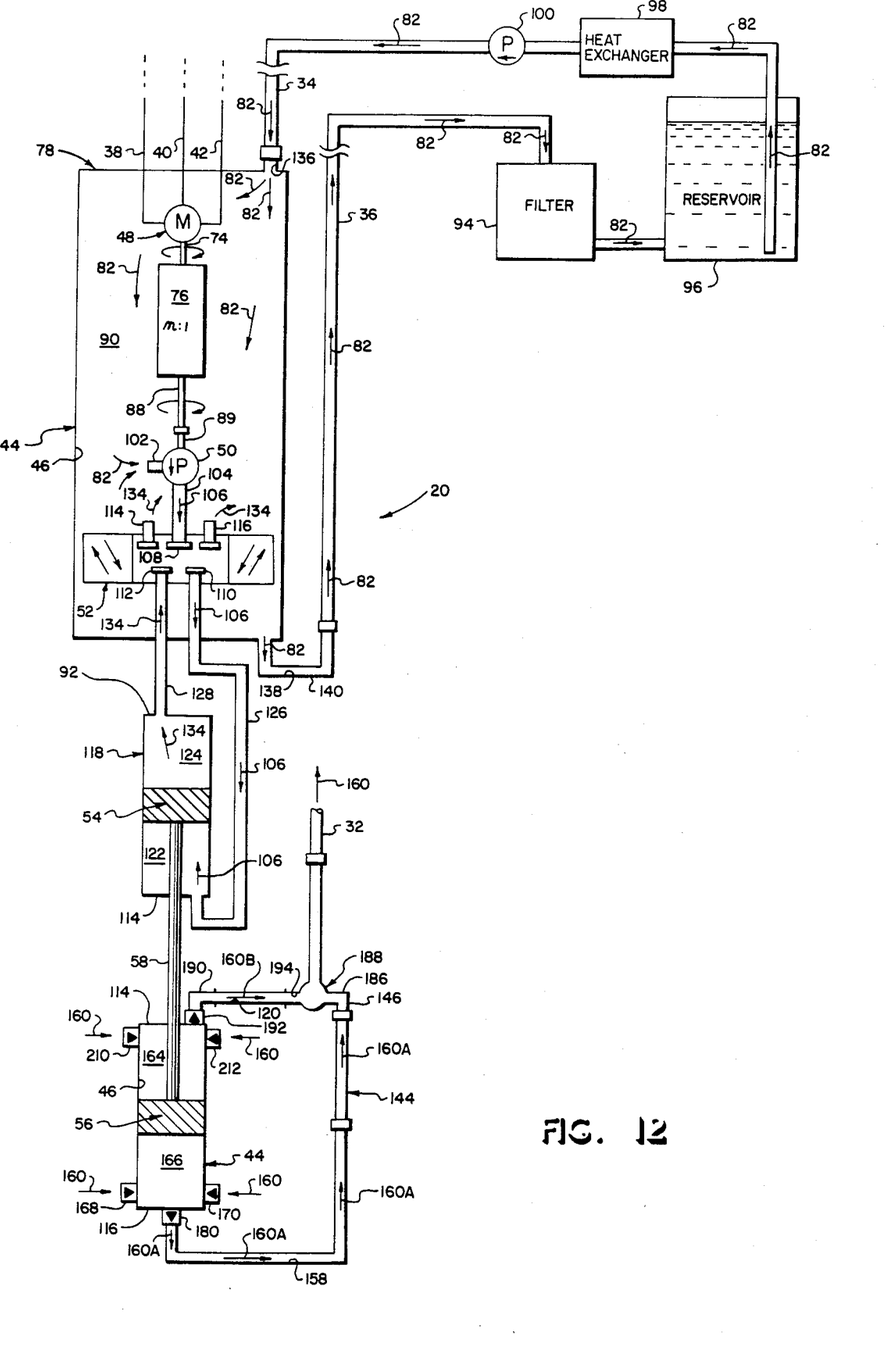
FIG. 12 is a simplified schematic view of a downhole pumping system constructed according to one aspect of the invention.

As can best be seen in FIGS. 3 and 12, spent hydraulic power fluid is circulated to and from the surface facility through the auxillary hydraulic conduits 34, 36. In the surface facility, the hydraulic power fluid undergoes filtering and heat exchange prior to being returned downhole. The pump 100 circulates the spent hydraulic power fluid at a rate, for example, two gallons per minute, which will ensure adequate heat transfer for operating the electric motor 48 and pump 50 at high power levels.

The pump 50 is provided with an inlet port 102 and a discharge port 104. As the pump is driven in response to rotation of the shaft 88, spent hydraulic power fluid is withdrawn from the reservoir 90 into the inlet port 102 and is discharged under pressure into the valve 52 through the outlet port 104. The pressurized hydraulic fluid produced by the pump 50 is used to drive the power piston 54 reciprocally through the bore 46. High pressure hydraulic flow is indicated by the arrow 106.

The valve 52 is an automatic shuttle valve which is responsive to the build-up of back pressure to shuttle flow from its high pressure inlet port 108 to a first outlet port 110 and subsequently to a second outlet port 112. The valve 52 is also furnished with first and second return circulation ports 114, 116 which empty into the reservoir 90.

Figure 4:
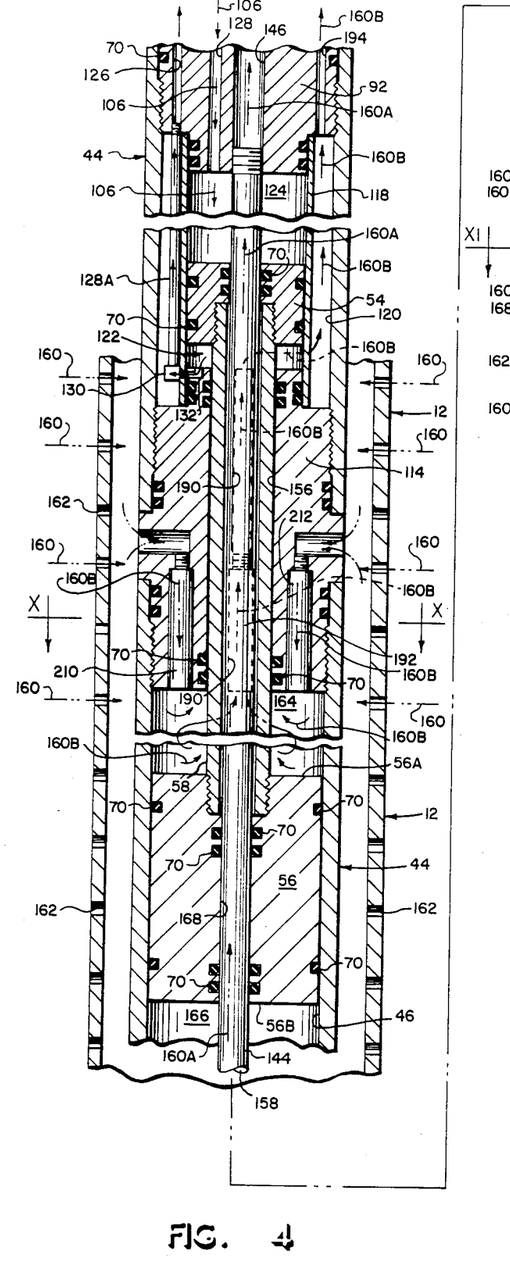
FIG. 4 is a downward continuation of FIG. 3.

Referring now to FIGS. 4 and 12, the pump housing 44 is further partitioned by an intermediate partition block 114 with its lower end being sealed by a block 116. The housing bore 46 which lies between the intermediate partition block 92 and intermediate partition block 114 is further divided by a cylindrical partition 118 in which the power piston 54 is slidably and sealably engaged. The annulus 120 between the cylindrical partition 118 and the pump housing 44 defines a flow passage for conveying formation fluid produced on the up-stroke.

The chamber bounded radially by the cylindrical partition 118 and axially by the intermediate partitions 92, 114 defines a power chamber which is subdivided by the power piston 54 into a lower pressure chamber 122 and an upper pressure chamber 124.

As can best be seen by referring to FIGS. 3, 4 and 12, the high pressure outlet ports 110, 112 of the valve 52 are connected in fluid communication with the lower and upper power chambers 122, 124 by conduits 126, 128, respectively. The conduits 126, 128 are preferably bores which extend axially through the intermediate partition block 92. The conduit 126 empties into the upper power chamber 124 while the conduit 128 is connected to the lower power chamber 122 through a tubular conduit extension 128A. The tubular conduit extension 128A is extended through the produced formation fluid annulus 120, with its lower end connected in fluid communication with the lower power chamber 122 through a L-fitting 130. The L-fitting extends into the annulus 120, and connects in communication with a small radially extending bore 132 which is in communication with the lower power chamber 122.

Referring now to FIG. 12, high pressure power fluid is directed through the outlet port 110 of the valve 52 and through the conduit 126 to drive the power piston 54 vertically upwardly through the power cylinder 118. Hydraulic fluid in the upper power chamber 124 is circulated outwardly, as indicated by the arrows 134, through the conduit 128 into the port 112 and then through the return circulation port 114, where it reenters the reservoir 90 at a relatively low pressure. Upon reversal of the shuttle valve 52, the flow of power fluid is reversed, with the high pressure power fluid 106 being ported into the upper power chamber 124, and the hydraulic fluid in the lower power chamber 122 being circulated through port 110 and port 116 into the reservoir 90. Thus, the lower and upper power chambers 122, 124 are alternately pressurized and relieved, thereby driving the piston 54 and connecting ram 58 reciprocally through the power cylinder 118.

It will be observed that the prime mover for this arrangement is the electrical motor 48, which is powered through electrical current conducted downhole through the conductors 38, 40 and 42. Moreover, the hydraulic power for driving the piston 54 is developed downhole by the pump 50 which is driven by the electrical motor 48. The relatively low pressure hydraulic power fluid in the reservoir 90 is circulated to the surface facility solely for purposes of filtering and heat exchange as previously discussed. This is in contrast with prior art pumping systems in which a surface facility pump develops the hydraulic pressure for driving a downhole motor. It will be appreciated that the present arrangement can be used at relatively greater depths, with the hydraulic pressure drop associated with long conduits being avoided, since the operating pressure is developed downhole. There is, of course, a pressure drop along the hydraulic conduits 34, 36; however, more than adequate pressure for circulating the hydraulic power fluid through the motor 48, transmission 76 and pump 50 for heat exchange and lubrication purposes, can be developed from the surface facility.

Referring now to FIGS. 2, 3, 4 and 6, the upper most partition block 60 is provided with axailly extending bores 136, 138 through which the hydraulic power fluid 82 is circulated into and out of the pump assembly 20. Upon entering the pump assembly, the hydraulic power fluid is directed through the electric motor 48, as previously discussed, flowing downwardly through the annulus between the connecting shaft 74 and the bore 80 of the intermediate partition block 66. The hydraulic power fluid 82 is circulated through heat transfer and lubrication passages 84 in the gear assembly 76 and downwardly through the annulus between the connecting shaft 88 and the bore 86 of the intermediate partition block 78. Thereafter, the hydraulic power fluid 82 is accumulated within the reservoir chamber 90 where it awaits intake by the pump 50. Spent power fluid 134 returned from the power cylinder 118 is discharged from the valve 52 into the reservoir 90, where it intermingles with the filtered and temperature controlled hydraulic power fluid 82.

Hydraulic power fluid is circulated out of the reservoir 90 through a tubular conduit 140 which has a lower open end received within the reservoir 90. The conduit 140 is extended through a bore 142 which extends axially through the partition block 78. The return conduit 140 is routed around the gear assembly 76 and is extended through the intermediate partition block 78. The return circulation conduit 140 is likewise routed around the electric motor 48 and extends through the bore 138 in the uppermost partition block 60. The upper end portion of the return circulation conduit 140 is extended out of the bore 138 and into the connector chamber 62 where it is joined by a swage lock connector 144 to the auxillary conduit 36. According to the foregoing circulation arrangement, the relatively low pressure hydraulic power fluid 82 is circulated freely in heat exchange and lubricating relation with the electric motor 48, the gear assembly 76 and the pump 50. It will be appreciated that the circulation of the spent hydraulic fluid 82 is carried out in a closed circulation system, which is maintained at a higher pressure relative to the produced formation fluid, thereby preventing contamination of the spent hydraulic power fluid by the formation fluid.

As previously discussed, the production piston 56 is coupled to the power piston 54 by means of a tubular ram 58. It will be appreciated that the long, slender tubular ram 58 is subjected to compression loading during a downstroke, and that for relatively long lengths, the tubular ram must be supported in some way to minimize radial deflection and thereby avoid buckling damage. According to an important aspect of the invention, the tubular ram 58 is reinforced against lateral deflection by an axially extending rod 144 which is maintained in tension loading between the intermediate partition block 92 and the lowermost block 116. The upper end of the tension rod 144 is threaded into engagement with a blind bore 146 which extends axially through the lowermost half of the partition block 92. The lower end of the tension rod 144 extends through an axially extending bore 148 through the lowermost partition block 116. The bore 148 is enlarged by a threaded counterbore 150. The lowermost end of the tension rod 144 is threaded and extends into the threaded counterbore 150. Received in threaded engagement with the threaded end of the tension rod 144 are a lock washer 152 and nut 154. Tension loading is induced within the guide rod 144 as the nut 154 is torqued. Thus, the guide rod is maintained under tension at all times during operation of the power piston, whereby the long, slender tubular ram 58 is reinforced. Further reinforcement of the tubular ram 58 against radial deflection is provided by the bore 156 of the intermediate partition block 114.

The guide rod 144 is preferably tubular with an axially extending bore 158 for conveying formation fluid 160 which is produced on the downstroke of the production piston 56.

Figure 5:
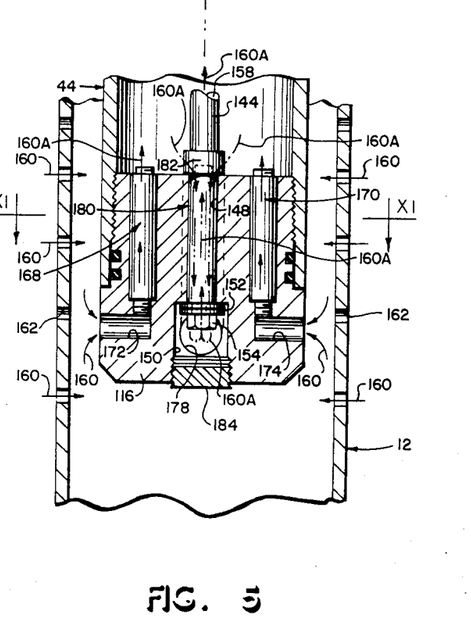
FIG. 5 is a downward continuation of FIG. 4.
Figure 6:
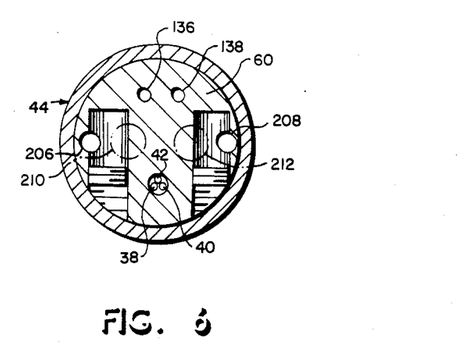
FIG. 6 is a horizontal sectional view taken as indicated by the line VI—VI of FIG. 2.
Figure 7:
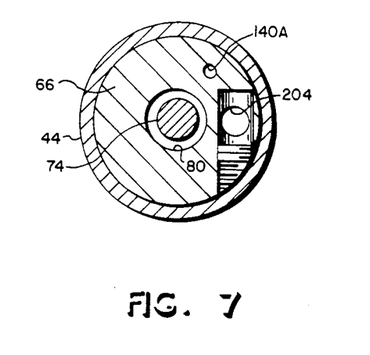
FIG. 7 is a horizontal sectional view taken as indicated by the line VII—VII of FIG. 2.
Figure 8:
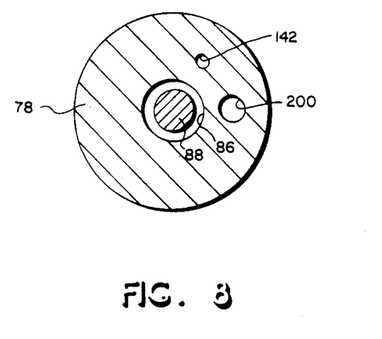
FIG. 8 is a horizontal sectional view taken as indicated by the line VIII—VIII.
Figure 9:
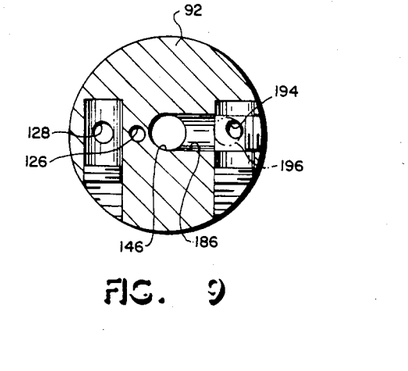
FIG. 9 is a horizontal sectional view taken as indicated by the line IX—IX of FIG. 3.

As can best be seen in FIGS. 4, 5 and 12, formation fluid 160 enters the well casing 12 through perforations 162.

An axially extending pump chamber is formed by the cylindrical bore 46 of the pump housing 44 between the intermediate partition block 114 and the lowermost block 116. The pump chamber is divided by the movable piston 56 into an upper pump chamber 164 and a lower pump chamber 166. The annular production piston 56 is sealed against the bore 46 by O-ring seals 70. The annular piston 56 is provided with an axially extending bore 168 which is sealed against the tension guide rod 144 by O-ring seals 70. According to this arrangement, the upper and lower pump chambers 164, 166 are sealed with respect to each other, and the annular production piston 56 is free to move reciprocally up and down along the tension guide rod 144.

As previously discussed, the tension guide rod 144 is preferably tubular, and having a bore 158 through which the produced formation fluid 160 is conveyed during the downstroke of the production piston 56. For convenience, formation fluid produced from the lowermost pump chamber 166 has been assigned reference numeral 160A, and formation fluid produced from the uppermost production chamber 164 has been assigned reference numeral 160B.

Referring now to FIGS. 4, 5 and 12, formation fluid 160 is drawn into the lower pump chamber 166 through check valves 168, 170 which are mounted within the end block 116. Formation fluid 160 flows through inlet ports 172, 174 which intersect the partition block 116. The check valves 168, 170 each form a produced fluid inlet for admitting formation fluid 160 into the lower pump chamber 166 during an upstroke, but block the flow of formation fluid during the downstroke. Produced formation fluid 160A is forced out of the lower pump chamber 166 through a large bore 176 which extends axially through the end block 116. The bore 176 is connected in communication with the counterbore 150 by a passage 178. Produced formation fluid 160A is admitted into the bore 158 of the tension guide rod through a check valve 180.

Preferably, the lower end of the tension guide rod 144 is mechanically coupled to the upper end of the check valve 180 by a coupling 182. The lower end of the check valve 180 is threaded and projects into the counterbore 150. The threaded end of the check valve 180 is engaged by the lock washer 152 and the tightening nut 154. The threaded counterbore 150 is sealed by a plug 184. Thus, the produced formation fluid 160A is forced downwardly through the bore 176 into the passage 178 and threaded counterbore 150, and upwardly through the check valve 180 and tension guide tube 144.

Following the flow of the produced formation fluid 160A upwardly, and referring to FIG. 4, the produced formation fluid 160A travels upwardly through the tension guide tube 144 and through the blind bore 146 of the intermediate partition block 92.

Referring now to FIG. 3, the produced formation fluid 160A exits the blind bore 168 through a passage 186 which laterally intersects the partition block 92. The laterally extending passage 186 terminates in a chamber 188 which serves as a header for receiving the produced flow 160A and the produced flow 160B.

Figure 10:
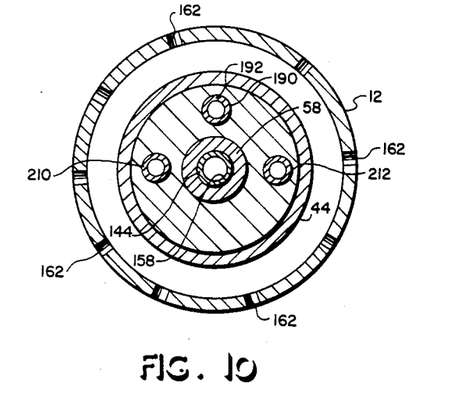
FIG. 10 is a horizontal sectional view taken as indicated by the line X—X.
Figure 11:
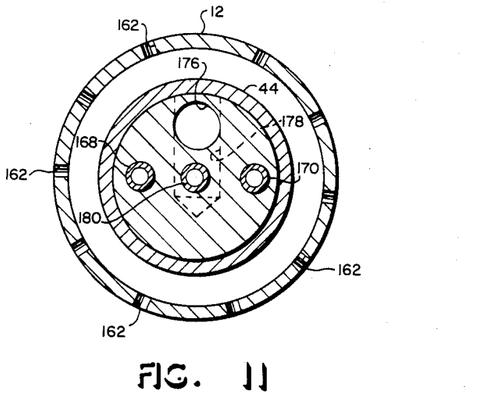
FIG. 11 is a horizontal sectional view taken as indicated by the line XI—XI of FIG. 5.

The flow of produced formation fluid 160B will now be traced as it is forced from the upper pump chamber 164. Referring now to FIGS. 3, 4 and 10, the intermediate partition block 114 is provided with an axially extending bore 190 in which a check valve 192 is received. The check valve 192 forms a produced fluid inlet port for admitting formation fluid into the bore 190. The bore 190 extends completely through the partition block 114, with its upper end forming a discharge outlet into the annulus 120. Produced formation fluid 160B is forced upwardly through the bore 190 into the annulus 120 where it bypasses the power cylinder 118. The annulus 120 is connected in fluid communication with the mixing chamber 188 through a bore 194 which extends axially through the intermediate partition block 92. Although only one bore 194 is illustrated, it will be understood that other axially extending bores 194 may be provided around the periphery of the partition block 92 as necessary to accommodate the flow rate of the produced formation fluid 160B.

Referring now to FIGS. 2 and 3, the produced formation fluid 160 is discharged out of the header chamber 188 through a series of axially extending bores and connecting tubes which extend outwardly through the pump structure to the connector chamber 62. In particular, intermediate partition block 92 is furnished with an axially extending bore 196 which communicates at its lower end with the header chamber 188. Its upper end is threaded and is engaged by an axially extending conduit 198 which extends through the reservoir chamber 90 upwardly to the intermediate partition block 78. The partition block 78 is likewise provided with an axially extending bore 200 which is threaded at each end. The lower threaded end of the bore 200 is engaged by the upper threaded end of the conduit 198. A bypass passage around the gear 76 is provided by a conduit 202. The conduit 202 is received in threaded engagement with an axially extending bore 204 in the intermediate partition block 66. The bore 204 is connected in fluid communication with the annulus 72 between the cylindrical motor partition 68 and the housing 44. The produced formation fluid 160 is forced upwardly through the annulus 72 until it meets the uppermost partition block 60. The uppermost partition block 60 is provided with axially extending bores 206, 208 and relatively large axially extending bores 210, 212. The bore 210 is connected in communication with the bore 212 through an axially extending bore 214. The combined flow is directed upwardly through the bore 212 into the auxiliary conduit 32.

Referring again to FIGS. 4 and 12, formation fluid 160 is admitted into the upper pump chamber 164 through a pair of check valves 210, 212. The check valves 210, 212 each form a produced fluid inlet port for admitting formation fluid 160 into the upper pump chamber 164, while preventing the outward flow of formation fluid from the chamber. The produced formation fluid 160B is conducted through the check valve 192 as previously discussed.

Figure 13:
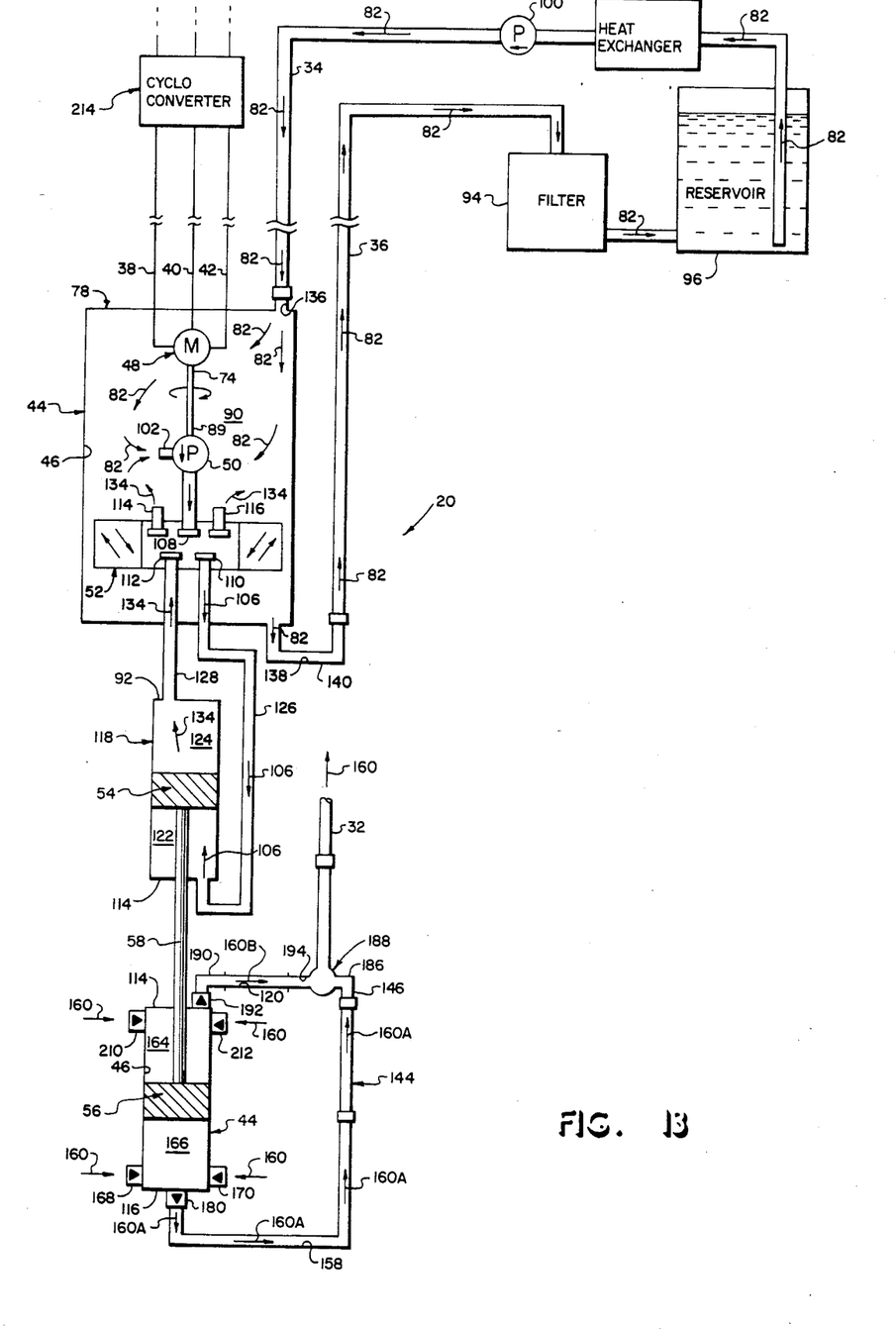
FIG. 13 is a simplified schematic view of a downhole pumping system constructed according to yet another aspect of the invention.

The pump 20 is set in motion by conducting three phase electrical power through the conductors 38, 40 and 42, which are carried in the flexible production tubing 22 downhole to the pump 20. The motor is connected in driving relationship with the pump 50, either through a gear drive unit 76 as shown in FIG. 13. In FIG. 12, the motor turns at a constant rpm, for example 12,000 rpm, and the gear unit 76 reduces the output to 2,000 rpm, within the operating range of the pump 50. If desired, however, the motor can be energized through a cyclo-converter 214 as indicated in FIG. 13. The cyclo-converter 214 is a static frequency converter having a variable frequency output for controlling the speed of rotation of the electric motor 48. According to this arrangement, the rotor speed of the electric motor 48 is continuously variable over a wide operating range, whereby the stroke of the power piston can be adjusted from time to time to accommodate changes in the producing formation.

High pressure hydraulic fluid 106 is discharged from the pump 50 as it is driven by the motor 48. This high pressure hydraulic power fluid flow is switched automatically from the upper power chamber 124 to the lower power chamber 122 of the power cylinder 118, thereby driving the power piston 54 in extension and retraction. As the power piston 54 is extended, hydraulic fluid in the lower power chamber 22 is circulated through the return conduit 126, as high pressure hydraulic fluid is discharged into the upper power chamber 124. On the upstroke, as the power piston is retracted, high pressure hydraulic fluid is forced downwardly through the conduit 126 into the lower pressure chamber 122, as the hydraulic power fluid in the upper chamber 124 is forced upwardly through the conduit 128 and is circulated into the reservoir 90. This reciprocal motion of the power piston 54 is transmitted to the production piston 56 through the tubular ram 58. Formation fluid 160 is admitted into the lower pump chamber 166, and formation fluid is produced through the check valve 192 as the piston 56 is retracted. When piston 56 is extended, the upper chamber 164 is filled through the check valves 210, 212, while the lower chamber is emptied as formation fluid is produced through the check valve 180.

It will be appreciated that a large quantity of heat will be generated by the electric motor 48, the gear drive 76 and the pump 50. Accordingly, the power hydraulic fluid 82 is continuously circulated through the motor housing, the gear housing, and the pump is immersed within the hydraulic power fluid in the reservoir 90. The hydraulic power fluid 82 is continuously circulated through a filter 94 and a heat exchanger 98 by a pump 100, all of which are located in a surface facility.

Referring to FIG. 4, it will be seen that the annular faces 56A and 56B are maximized with respect to the diameter of the pump housing bore 46 for maximum efficiency due to the concentric flow passage provided by the bore 158 of the tension guide tube 144.

It will be appreciated that the pump assembly 20 described above is capable of long stroke service and, because the pumping hydraulic power is developed within the pump downhole, it has increased pumping power for service in very deep wells. Moreover, the electric motor and pump are lubricated and cooled by the circulation of the spent hydraulic power fluid, thereby enabling the unit to be operated at relatively high power levels. The electrically powered, hydraulic piston pump 20, when powered through the cyclo-converter 214, is continuously variable in stroke speed, to accommodate changing formation conditions. Moreover, the pump is double-acting, with production being achieved on both the upstroke and the downstroke. A relatively greater stroke and greater production are achieved on each stroke because of the relatively long, tubular connecting ram which is reinforced against lateral deflections by the tension guide rod. The overall assembly is of rugged construction and has a minimum number of moving parts for reliable operation under adverse downhole conditions.

What is claimed is:

1. A pump for downhole installation in a wellbore for pumping production fluids from a well formation comprising:
   an elongated pump housing having an axially extending cylindrical bore;
   means forming spaced apart first and second opposed partition blocks at opposite ends of said bore;
   an annular pump piston reciprocably disposed in and in substantial sealing engagement with said bore and dividing said bore into opposed pump chambers; and
   an elongated tubular guide rod extending between said first and second partition blocks and axially through said bore, said guide rod being secured stationary in said bore and extending through said annular pump piston in guiding relationship to said annular pump piston, and said guide rod forming passage means for conducting production fluid from one of said chambers to a production fluid discharge conduit of said pump.

2. A pump for downhole installation in a wellbore for pumping production fluids from a well formation, said pump comprising:
   elongated housing means comprising first and second cylindrical bores axially spaced apart in said housing means;
   first partition block means closing a lower end of said first bore;
   intermediate partition block means closing the upper end of said first bore and the lower end of said second bore, and an axial bore extending through said intermediate partition block means and opening into said first and second bores, respectively;
   second partition block means closing the upper end of said second bore;
   an elongated guide rod secured stationary between said first and second partition block means and extending coaxially through said bores;
   respective annular production fluid and power fluid pistons disposed in said first and second bores, respectively, and interconnected by ram means extending through said axial bore in said intermediate partition block means; and
   said pistons and said ram means being slidably guided in sleeved relationship along said guide rod during reciprocation in said bores, respectively, to pump production fluids from opposed chambers formed in said first bore by said production fluid piston.

3. The pump set forth in claim 2 wherein:
   said guide rod includes fluid passage means formed therein and in communication with fluid passage means in said first and second partition block means for conducting production fluid from said first bore to a production fluid discharge conduit of said pump.

4. The pump set forth in claim 3 wherein:
   said passage means in said guide rod is in communication with a chamber formed in said first bore between said first partition block means and said production fluid piston.

5. The pump set forth in claim 4 wherein:
   said housing means includes passage means for conducting production fluid from another chamber of said first bore to said production fluid discharge conduit.

6. The pump set forth in claim 5 wherein:
   said passage means for conducting production fluid from said other chamber includes passages formed in said intermediate partition block.

7. The pump set forth in claim 6 wherein:
   said passage means for conducting production fluid from said other chamber includes a passage formed between an outer cylindrical housing part extending between said second and third partition blocks and an inner cylindrical housing part forming said second bore.

8. A pump for downhole installation in a wellbore for pumping production fluids from a well formation comprising:
   an elongated pump housing having an axially extending cylindrical bore;
   means forming spaced apart first and second opposed partition blocks at opposite ends of said bore;

an annular pump piston reciprocably disposed in and in substantial sealing engagement with said bore and dividing said bore into opposed pump chambers;

an elongated guide rod extending between said first and second partition blocks and axially through said bore, said guide rod being secured in tension stationary in said bore, said guide rod extending through said annular pump piston and operably engaged with means associated with said annular pump piston to minimize radial deflection of said annular pump piston during reciprocation of said annular pump piston in said bore; and, said guide rod including a bore extending therethrough for conducting production fluid from at least one of said chambers to a production fluid discharge conduit.

9. The pump set forth in claim 8 wherein:

one end of said guide rod is mechanically connected to valve means secured to said first partition block and including means for tensioning said guide rod.

10. The pump set forth in claim 9 wherein:

said bore in said guide rod is in communication with said valve means for conducting production fluid from said one chamber through said valve means to said discharge conduit.

11. The pump set forth in claim 8 wherein:

said means associated with said annular pump piston comprises an elongated tubular ram disposed in sleeved relationship around said guide rod and connected to said annular pump piston and to means for actuating said annular pump piston.

12. The pump set forth in claim 11 wherein:

said means for actuating said annular pump piston includes a power piston connected to said ram and disposed in a second bore formed in housing means of said pump, and said pump includes a third partition block closing one end of said housing means and secured to said guide rod.

13. The pump set forth in claim 12 wherein:

said guide rod extends through said second partition block and includes means for securing said guide rod to said first partition block to secure said guide rod in tension.

14. The pump set forth in claim 12 wherein:

said third partition block includes passage means for conducting production fluid from said one chamber by way of passage means formed in said guide rod, and said third partition block includes passage means for conducting production fluid from the other of said chambers to said production fluid discharge conduit.

15. The pump set forth in claim 12 wherein:

said ram extends through bore means in said second partition block, and said guide rod, said ram, and said bore means in said second partition block are dimensioned to provide for reinforcement of said ram against radial deflection in said housing.

* * * * *